United States Patent Office 3,534,249
Patented Oct. 13, 1970

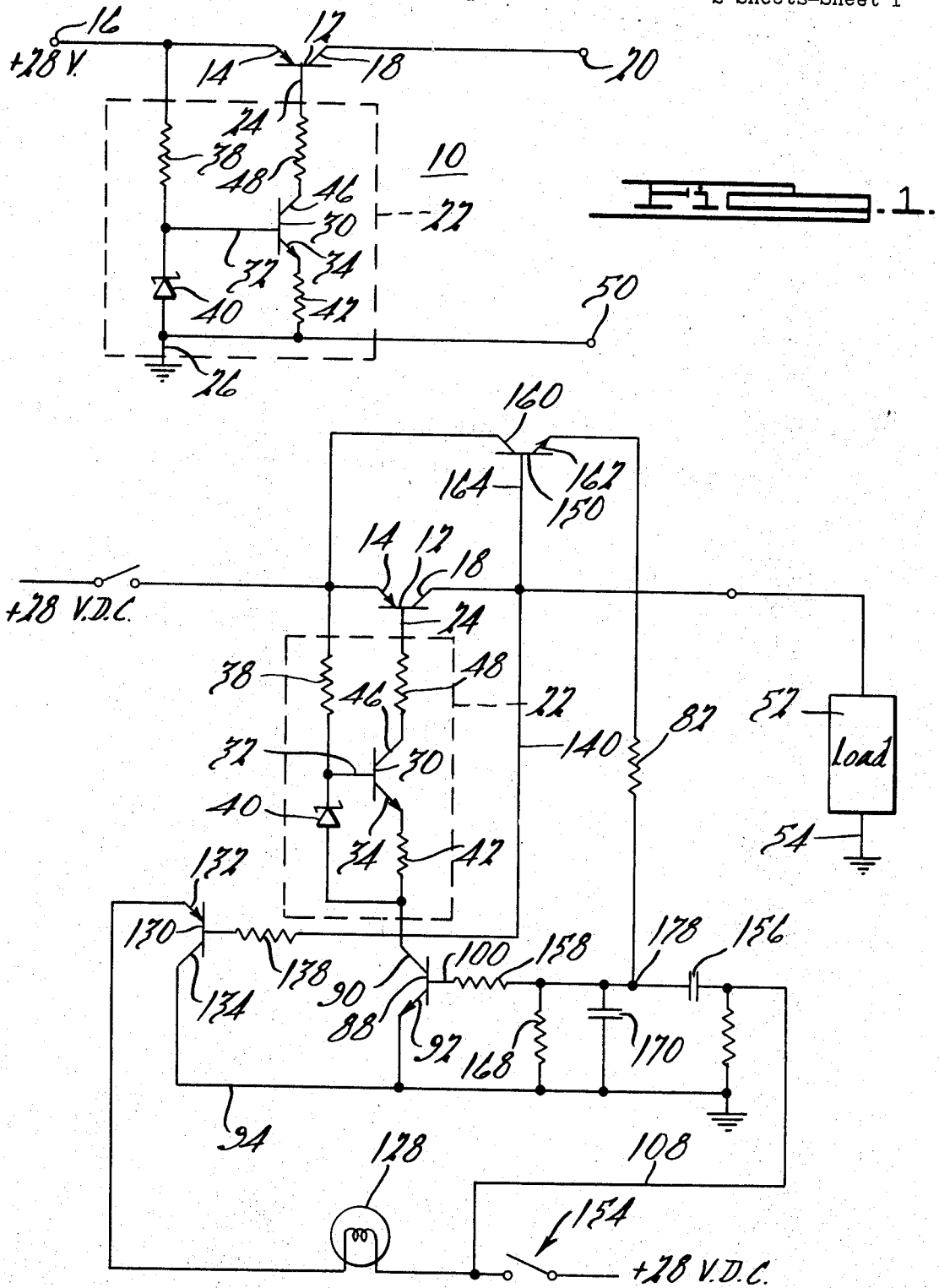

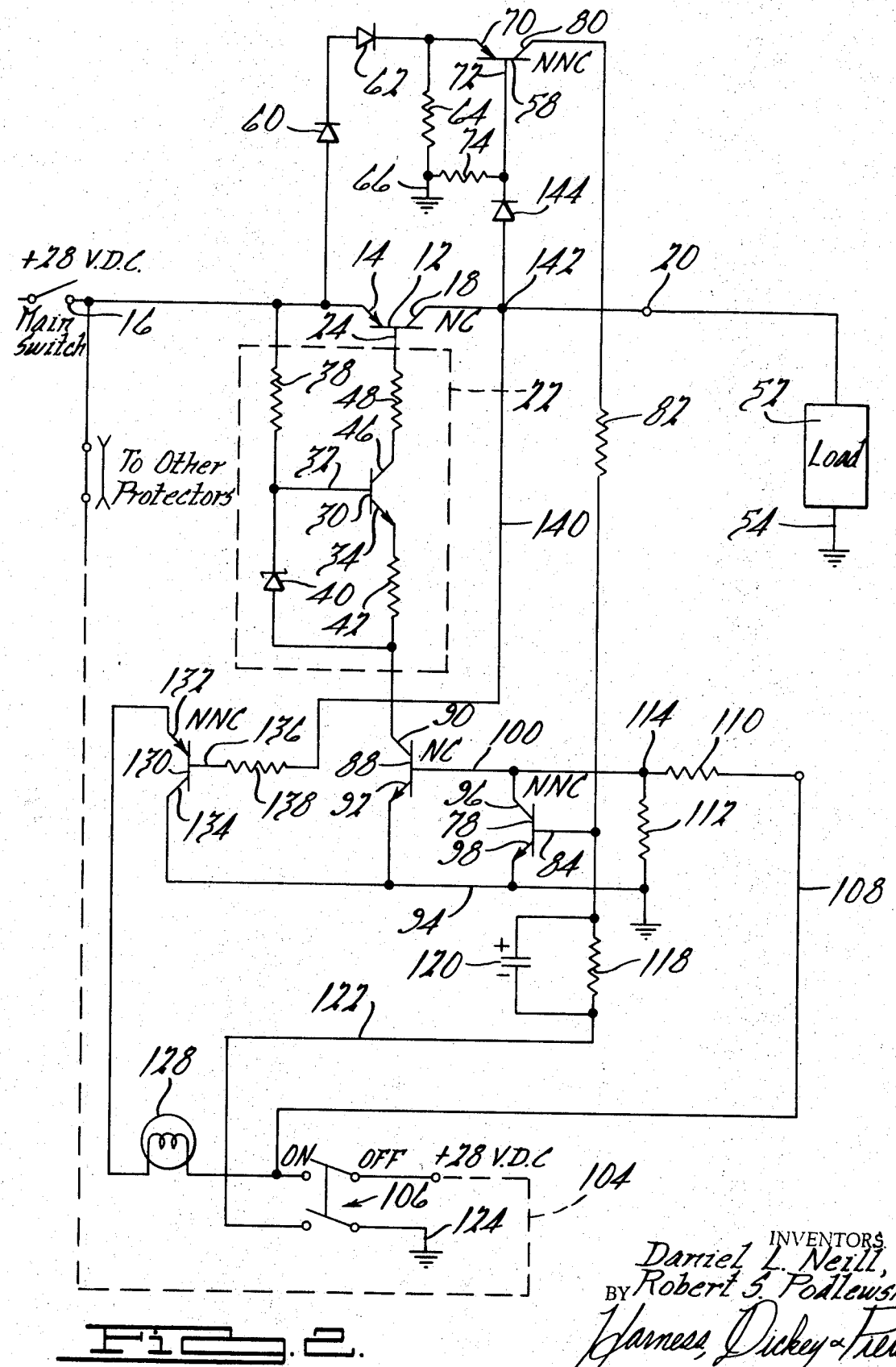

3,534,249
CURRENT REGULATING NETWORK WITH OVERLOAD PROTECTION
Daniel L. Neill and Robert S. Podlewski, Jackson, Mich., assignors to Mechanical Products, Inc., Jackson, Mich., a corporation of Delaware
Filed July 5, 1967, Ser. No. 651,310
Int. Cl. G05f 1/58
U.S. Cl. 323—4     7 Claims

ABSTRACT OF THE DISCLOSURE

A semiconductor current controlling system wherein a transistor is interconnected between a source of electrical energy and a load for use in providing a relatively constant current to the load irrespective of source variations. The system is provided with a protective network in the event that a current overload is drawn by the load device for any reason. This overload is sensed as a change in electrical characteristic, particularly the voltage drop, of the transistor and a control signal is developed which is utilized to switch the transistor to the nonconductive state as to preclude further substantial current flow to the load.

BACKGROUND OF THE INVENTION

This invention relates generally to semiconductor current control circuits which include overload protective features and more particularly relates to a transistor circuit break which is insensitive to souce variations and, in a modified form, is provided with a trip characteristic which varies inversely with the magnitude of the overload.

The widespread replacement of vacuum tubes in electronic circuitry with semiconductor elements has given rise to the need for a fast-acting system for protecting the semiconductor elements from current overload. Vacuum tube type circuitry normally is able to withstand overloads for a short period of time thus permitting the use of slow-acting fuses and other like devices which permitted the overload current to exist from several milliseconds to several hundred seconds. However, present semiconductor circuits, particularly the components thereof, are capable of being destroyed by the heat generated due to overload currents of a duration of the order of microseconds. Accordingly, the circuit designer is forced to utilize components of a much higher rating than necessary to withstand minor overloads thus resulting in higher costs due to the use of higher rated components.

The circuit of the present invention utilizes, in a preferred embodiment, a current limiting type of circuit which is utilized in conjunction with an overload protective network. The protective network is adapted to interrupt the load current in a controllable manner upon the sensing of an overload of sufficient magnitude to destroy the semiconductor devices being utilized in the network. The system of the present invention utilizes a network which interrupts the load current when the load current through the main load carrying semiconductor device reaches a preselected trip value, the value being chosen in accordance with the load current which can be accommodated by the main current carrying semiconductor device.

In a modification of the invention, a time responsive interruption network is utilized which varies the trip responsive time of the network in accordance with an inverse relationship to the magnitude of the overload current. Thus, the circuit will accommodate minor overloads of a short duration which are insufficient in either magnitude or duration to destroy the power semiconductor elements.

Accordingly it is one object of the present invention to provide an improved current interruption system.

It is another object of the present invention to provide a current limiting system which is protected by a current interruption circuit, the current interruption circuit being responsive to a preselected trip value of load current.

It is still a further object of the present invention to provide a current limiting and current interruption system which is substantially unaffected by certain variations in power supply characteristics.

It is still another object of the present invention to provide an improved current interruption circuit, the trip response time of the current interruption circuit varying in inverse relation to the magnitude of the overload.

It is still a further object of the present invention to provide an improved current interruption system of the type described having ambient temperature compensation features.

Further objects, features and advantages of this invention will become apparent from a consideration of the following description, the appended claims and the accompanying drawings in which:

FIG. 1 is a schematic circuit diagram illustrating a power transistor connected in series between the energy source and load, the transistor being supplied with emitter-base current by a constant current regulator;

FIG. 2 is a schematic circuit diagram of an improved transistor circuit interrupter incorporating the current control system of FIG. 1; and FIG. 3 is a schematic circuit diagram of a modified transistor circuit interrupter similar to that illustrated in FIG. 2, and further including a time delay network to vary the trip response time as a function of the magnitude of the overload current.

Referring now to FIG. 1 there is illustrated a current limiting network 10 consisting of a main power regulating transistor 12 having an emitter electrode 14 connected to an input source of electrical energy at input terminal 16 and a collector electrode 18 connected to a load terminal 20. The emitter-collector circuit of transistor 12 is connected to control the amount of current being supplied to the load terminal 20. A constant current driver network 22 is connected between the input terminal 16, a base electrode 24 of the transistor 12 and ground 26 to provide a constant emitter-base current for main power transistor 12.

The driver circuit 22 includes a driver transistor 30 having a base electrode 32 and an emitter electrode 34 connected in circuit with a voltage divider network including a resistor 38 and Zener diode 40 connected across the source of electrical energy. The base-emitter circuit of transistor 30 and a current limiting resistor 42 are connected in parallel with the Zener diode 40, the parallel circuit being connected in series between the resistor 38 and ground 26. The constant voltage of the Zener diode 40 provides a constant base-emitter bias voltage for transistor 30 thereby causing transistor 30 to conduct at a constant level. The collector-emitter circuit of transistor 30 includes a collector 46 which is connected to the base electrode 24 by means of a current limiting resistor 48. The collector-emitter circuit of transistor 30 provides a conductive path for the emitter-base circuit of transistor 12 thereby supplying a constant current, base-emitter bias for transistor 12.

In operation, the current supplied to a load connected between the load terminals 20, 50 is equal to the emitter-base current of transistor 12 multiplied by the gain of the transistor. Therefore, the load current is determined by both the gain and the emitter-base current of transistor 12. Assuming that the gain of transistor 12 is constant, the load current delivered to load terminals 20, 50 will also be constant since the emitter-base current is held to be constant by the driver network 22. The current being drawn through the collector-emitter circuit of transistor 30 remains a constant further assuming that the voltage at input terminals 16 remains above the avalanche or breakdown voltage of Zener diode 40. A particular value of the base-emitter current of transistor 30 may be selected by selection of the resistor 42 and resistor 42 may be selected from temperature sensitive resistive elements, for example thermistors, to compensate the driver network 22 for ambient temperature variations.

FIG. 2 illustrates a preferred embodiment of a transistor circuit breaker which may be utilized with the current limiting network discussed in conjunction with FIG. 1, the common elements of FIGS. 1 and 2 being given common reference numerals. During the normal operation of the circuit the transistors 12 and 30 are normally conductive. The load current through power transistor 12 and a load circuit 52, the latter of which is connected to ground at 54, is sensed by means of a normally nonconductive transistor 58 connected in parallel with the power transistor by means of a pair of diodes 60, 62 and a resistor 64 connected to ground at 66 for one path and a resistor 74 connected to collector electrode 18 via diode 144. The voltage developed across this circuit is normally inadequate to provide sufficient bias for the base-emitter circuit of transistor 58 including the emitter electrode 70, the base electrode 72 and the resistor 74. Accordingly, for normal load current the transistor 58 would be nonconductive.

The output of the transistor 58 is connected to a normally nonconductive transistor 78 by means of a collector electrode 80, a current limiting resistor 82 and a base electrode 84 of transistor 78. The transistor 78 is connected to control the conduction of a transistor 88 connected in series circuit with the collector-emitter circuit of transistor 30. In this latter circuit, a collector electrode 90 of normally conductive transistor 88 is connected to current limiting resistor 42 and an emitter electrode 92 is connected to ground by means of a conductor 94.

The conduction of transistor 88 is controlled by the conductive state of transistor 78 by a circuit including a collector electrode 96 connected to base electrode 100 of transistor 88 and emitter electrode 98 of transistor 78 is connected to ground through the conductor 94. Accordingly, with the transistor 12 in a normal condition, the transistor 58 will be nonconductive, thereby rendering transistor 78 nonconductive. With the transistor 78 nonconductive, the base electrode 100 of transistor 88 is raised in voltage above the voltage of emitter 92 thereby maintaining transistor 88 in the conductive state. The conduction of transistor 88 permits driver transistor 30 to conduct thereby permitting power transistor 12 to supply load current to the load 52.

The base-emitter current for transistor 88 is supplied from the source of DC potential at terminal 16 through a conductor 104, an on-off switch 106, a conductor 108 and a resistive voltage divider including resistors 110 and 112. Accordingly, with the switch 106 in the on position, a DC potential is supplied to node 114 by means of the circuit just described, thereby providing base-emitter current for transistor 88. Similarly, the on-off switch 106 completes a path from the emitter-collector circuit of transistors 58 through resistor 82, a parallel resistor 118-capacitor 120 combination, a conductor 122 to ground at 124 for a purpose to be hereinafter explained.

In order to indicate a tripped condition to the user, a trip indicator circuit is provided by means of a trip indicator lamp 128 and a normally nonconductive transistor 130. The emitter electrode 132 of transistor 130 is connected directly to the indicator lamp 128 and the collector electrode 134 is connected to ground by means of conductor 94. It is to be noted that the emitter electrode 132 is substantially at 28 volts DC through the connection of the emitter electrode 132 to the positive source of potential by means of indicator lamp 128 and on-off switch 106. The transistor 130 is maintained in the non-conductive state due to the fact that the base electrode 136 is connected by means of a current limiting resistor 138 and a conductor 140 to a node 142 which is also substantially at 28 volts DC potential, ignoring the drops through the emitter-collector circuit of transistor 12 and any leakage current, during the period that the circuit is operating in its normal load condition. Thus the base 136 and emitter 132 are substantially at the some potential.

In the operation of FIG. 2, and assuming that the load current is below the trip value, transistor 12 is in the normally conductive is below the trip value, transistor 12 is in the normally conductive and saturated state feeding current to the load. Thus, an insufficient voltage exists across the main circuit of transistor 12 to enable transistor 58 to conduct. In this condition, substantially identical voltages are supplied to both the emitter 70 and base 72 electrodes of transistor 58 due to the fact that a diode 144 clamps the base electrode 72 to the voltage of the collector electrode 18.

Also, under normal conditions, a positive voltage is applied to terminal 114 such that voltage divider 110, 112 supplies approximately one volt to the base of transistor 88. This voltage is sufficient to maintain transistor 88 in the conductive state. This latter transistor provides a current path for the constant current driver transistor 30. Since the base-emitter circuit of transistor 78 is supplied by the emitter-collector circuit of transistor 58, transistor 78 is also rendered in the nonconductive state.

However, if the load current should attempt to exceed the trip value, a substantial voltage difference is developed across the emitter-collector circuit of main power transistor 12 which voltage is supplied to the transistor 58. This excessive drop across transistor 12 is sufficient to forward bias the emitter-base junction of transistor 58 thereby rendering transistor 58 to the conductive state. The output circuit of transistor 58 is connected to normally nonconductive transistor 78 to switch transistor 78 to the full on conductive state, thereby lowering node 114 to substantially ground potential. With node 114 at ground potential, the base electrode of the base-emitter circuit of transistor 88 is supplied with an insufficient voltage to maintain conduction of transistor 88 thereby turning transistor 88 off. The nonconductive state of transistor 88 cuts off the flow of current through the collector-emitter circuit of transistor 30 to cut off the emitter base current of transistor 12. In this way the supply of load current to the load 52 is interrupted with the turning off of transistor 12 and the circuit is tripped.

The occurrence of the cutoff of transistor 12 causes an even larger voltage to be supplied to transistor 58, maintaining transistor 58 in the conductive state, and a stable trip state for the circuit breaker network is established. With node 142 at substantially ground potential, normally nonconductive transistor 130 is rendered conductive thereby completing a circuit from positive source of D.C. potential at conductor 104 through the indicator light 128, the emitter-collector circuit of transistor 130 is ground at conductor 94. In this way the indicator light is energized to indicate the fact that the circuit breaker has been tripped.

To reset the circuit breaker, switch 106 is switched to the off position thereby removing the positive signal from junction 114 and the ground from resistor 118 and capacitor 120. It is to be noted that during the conduction of transistor 58, the capacitor 120 is charged through resistor 82 through the capacitor 120, the conductor 122, the switch 106 to ground and 124. With the switch 106 in the open position, the capacitor 120 discharges through resistor 118. With the switch 106 opened, a conductive path for transistor 58 is still maintained through the base-emitter circuit of transistor 78 thereby maintaining transistor 78 in the conductive state. However with the reclosing of the switch 106, transistor 78 is turned off due to the fact that its base electrode 84 is momentarily grounded through the now discharged capacitor 120.

The positive signal simultaneously appearing at node 114 forward biases transistor 88 to permit base-emitter current to flow through transistor 88 thereby switching transistor 30 and ultimately transistor 12 to the conductive state. A return to the conductive state by transistor 12 causes transistor 58 to switch to the nonconductive state. It is to be noted that the transistor 58 must be rendered nonconductive before capacitor 120 charges sufficiently to turn transistor 78 back on. However resistor 82 is chosen such that capactor 120 is charged very slowly.

Additionally, it can be seen that the combination of resistors 82 and 118 in conjunction with capacitor 120 form a time delay network which controls the instant of time the protector will trip after an overload occurs. As the transistor 58 turns on to cause charging current to flow to the capacitor 120, the charging of capacitor 120 delays the conduction of transistor 78 until sufficient charge is achieved. The actual values of resistors 82, 118 and capacitor 120 may be varied to produce the desired time delay or substantially eliminate the delay.

If the overload or faulty condition is not removed prior to reset, transistor 12 presents the above overload conditions to the sensing circuit as the load will demand more base current than the constant current driver circuit 22 will allow, transistor 58 will not turn off and the protector circuit will remain in the trip condition. It is sometimes desirable to have the circuit protector assume the condition dictated by the position of switch 106 when the main power is turned on by actuation of a switch connected to terminal 16. If switch 106 is closed, the supply voltage will appear simultaneously at the junctions 114 and an input terminal 16 wherein the input switch connected to junction 16 is closed. Capacitor 120 will then keep transistor 78 off long enough for transistor 12 to saturate so as to prevent actuation of transistor 58.

Referring now to FIG. 3, it has been found desirable to have the trip time of the circuit breaker vary inversely with the percentage of overload. For example, if a two-hundred-percent overload occurs, it is desirable that the circuit require a longer time to trip than, for example, if a one thousand percent overload occurred.

The circuit of FIG. 3 is designed to accomplish the above noted delay in the trip response time. The circuit of FIG. 3 is substantially the same as that disclosed and illustrated and described in conjunction with FIG. 2 with certain minor exceptions. The transistor which is utilized to sense the overload has been replaced by an NPN transistor 150 in lieu of the PNP transistor utilized in FIG. 2 and the biasing network has been eliminated in conjunction with transistor 150. The transistor 150 is normally conductive and directly drives the transistor 88. Further, switch 106 has been replaced by a switch 154, a single pole switch connected to a 28-volt source of DC potential. Initial turn on is accomplished by closing switch 154 which would create a positive pulse at the base of transistor 88 through the coupling capacitor 156 and current limiting resistor 158. This positive pulse at the base of transistor 88 causes the transistor to turn on and permits base current to flow through transistor 30 thus turning on transistor 12.

The turning on of transistor 12 causes transistor 150 to start conducting and transistor 88 is maintained in the conductive state after the turn on pulse through capacitor 156 decays. The transistor 150 includes a collector electrode 160 and emitter electrode 162 and a base electrode 164, the transistor being connected in a common base configuration such that the emitter electrode 162 will follow the voltage being supplied to the base during the period that the transistor 150 is in the conductive state.

Transistor 88 is maintained in the conductive state by means of a forward biasing voltage provided through voltage divider resistor 158 and 168 and a capacitor 170 is connected in parallel with resistor 168 and is charged to the biasing voltage at the junction between resistors 158 and 168. During the period that no current overload occurs, transistor 12 will remain in the conductive state, as will transistor 88, and substantially the full supply voltage will be impressed on the load 52.

In the event of an overload current through transistor 12, transistor 12 will become unsaturated, reducing the voltage at base 164 of transistor 150. This will, in turn, reduce the voltage at emitter 162 by a like amount. The emitter 162 voltage will track the base 164 voltage thereby reducing the voltage at junction 178 proportionately. During this period the capacitor 170 will discharge to the new voltage at junction 178 through resistor 168 and resistor 158 in series with the base emitter circuit of transistor 88. This condition reduces the conduction of transistor 88 to drive the transistor 88 out of saturation thus increasing the effective impedance of the base-emitter junction of transistor 88. This effect causes the reduction in the rate of discharge of capacitor 170.

If, assuming a relatively small overload condition, the voltage junction 178 is sufficient to keep transistor 88 in the partially conductive state, a feedback condition between transistor 88, constant current driver circuit 22 and transistor 150 is established. As stated above, the transistor 88 is not in the saturated state; however, it is still conductive, thereby reducing the collector-emitter current through the transistor. This in turn reduces the current that is supplied to the emitter-base circuit of transistor 12 and further reduces the base voltage of transistor 150 and, therefore, the voltage at the junction 178.

As stated above, the current required to drive transistor 88 comes from transistor 150 through the resistor 82. As resistor 82 is relatively large with respect to resistor 168, insufficient current is supplied through the path. At this time, capacitor 170 helps supply the required current by supplying the difference between the total current required to drive transistor 88 and that current available from transistor 150. This overall effect is degenerative and capacitor 170 gradually discharges until transistor 88 is rendered nonconductive. As was the situation with FIG. 2, this condition cuts off the flow of current through transistor 30 and thus switches transistor 12 to the nonconductive state.

As full recovery can be achieved by transistor 12 at any time from the initiation of the overload until transistor 88 is rendered nonconductive, a time delay related to the magnitude of the overload is obtained. As is seen, the greater the overload magnitude, the lower the voltage at junction 178 when the feedback process begins and the more quickly capacitor 170 will become unable to maintain transistor 88 in the conductive state. A bolt or instantaneous fault, for example, will immediately reverse bias the base-emitter junction of transistor 150, thereby rendering the transistor 150 to the nonconductive state. Capacitor 170 will immediately discharge through resistor 168 and transistor 88 will turn off in a very short time. Both the minimum turn off time produced by this instantaneous fault and the maximum turn off time for a small overload are controlled by the magnitude of capacitor 170. Resistor 168 also has an effect on the initial time period while transistor 88 is being rendered unsaturated.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A circuit for interrupting current to a load circuit supplied from a power source comprising a three-terminal controllable main switch transistor including a control electrode and an emitter-collector circuit connected in circuit with the power source and the load circuit for controlling the current flowing between the power source and the load, a constant current driver connected to said control electrode to maintain a normally constant current to said control electrode for maintaining a normally constant current to said control electrode and constant conduction of said main switch transistor and the load current when a load is connected to said switch transistor, and overload means responsive to an overload current for deenergizing said driver and causing the main transistor to interrupt said overload current when an overload occurs, said overload means being connected to sense the voltage drop across said emitter-collector circuit of said switch transistor, said constant current driver including a driver transistor having its collector-emitter circuit connected in the emitter-base circuit of said switch transistor, the bias voltage of said driver transistor being supplied by a substantially constant voltage device.

2. The circuit of claim 1 wherein said deenergizing means comprises a transistorized network including a transistor connected in controlling relation with the collector-emitter circuit of said driver transistor such that the collector-emitter circuit of said driver transistor is open circuited upon the sensing of said overload current.

3. The circuit of claim 2 wherein said deenergizing means includes a normally nonconducting transistor having an emitter-base circuit connected in voltage sensing relation with said emitter-collector circuit of said switch transistor to render said normally nonconductive transistor conductive upon sensing said overload condition, the conduction of said normally nonconductive transistor causing said open circuiting of the collector-emitter circuit of said driver transistor.

4. The circuit of claim 2 wherein said deenergizing means includes a normally conductive transistor connected in voltage sensing relation with the emitter-collector circuit of said switch transistor such that the increase of voltage drop across said emitter-collector circuit of said switch transistor causes the nonconduction of the normally conductive transistor and the open circuiting of the collector-emitter circuit of said driver transistor.

5. A circuit for interrupting current to a load circuit supplied from a power source comprising a three terminal controllable main switch transistor including a control electrode and an emitter-collector circuit connected in circuit with the power source and the load circuit for controlling the current flowing between the power source and the load, a constant current driver connected to said control electrode to maintain a normally constant current to said control electrode and constant conduction of said main switch transistor and the load current when a load is connected to said switch transistor, and overload means responsive to an overload current for de-energizing said driver and causing the main transistor to interrupt said overload current when an overload occurs, said overload means being connected to sense the voltage drop across said emitter-collector circuit of said switch transistor, said overload de-energizing means including timing means responsive to the magnitude of the overload for varying the cut-off time of said switch transistor in inverse relationship to the magnitude of the overload.

6. An improved transistor circuit as defined in claim 5 wherein said timing means is a capacitor connected between said switch transistor and said driver in a feedback loop.

7. An improved transistor circuit as defined in claim 6 wherein said deenergizing means includes a normally conductive transistor connected in voltage sensing relation with the emitter-collector circuit of said switch transistor such that the increase of voltage drop across said emitter-collector circuit of said switch transistor causes the nonconduction of the normally conductive transistor and the open circuiting of the collector-emitter circuit of said driver transistor.

References Cited
UNITED STATES PATENTS

| | | | |
|---|---|---|---|
| 3,074,006 | 1/1963 | Klees | 323—9 |
| 3,090,905 | 5/1963 | Ehret | 317—33 X |
| 3,182,246 | 5/1965 | Lloyd | 323—9 X |
| 3,450,319 | 10/1968 | Barringer | 317—33 X |
| 2,832,035 | 4/1958 | Bruck et al. | |
| 3,434,038 | 3/1969 | Vette | 323—4 |

J. D. MILLER, Primary Examiner

A. D. PELLINEN, Assistant Examiner

U.S. Cl. X.R.

317—33; 323—9

PO-1050
(5/69)

UNITED STATES PATENT OFFICE
CERTIFICATE OF CORRECTION

Patent No. 3,534,249          Dated October 13, 1970

Inventor(s) Daniel L. Neill and Robert S. Podlewski

It is certified that error appears in the above-identified patent and that said Letters Patent are hereby corrected as shown below:

Column 1, line 31, "break" should be --breaker--. Column 3, line 62, "transistors" should be --transistor--. Column 4, line 12, 13, delete "is below the trip value, transistor 12 is in the normally conductive"; line 58, "is" should be --to--.

Column 8, References Cited, "3,450,319" should be --3,405,319--.

SIGNED AND SEALED
FEB 23 1971

(SEAL)
Attest:

Edward M. Fletcher, Jr.
Attesting Officer

WILLIAM E. SCHUYLER, JR
Commissioner of Patents